Jan. 28, 1930.  E. S. PARKER  1,745,340
BROILER AND TOASTER
Filed Sept. 17, 1927    2 Sheets-Sheet 2
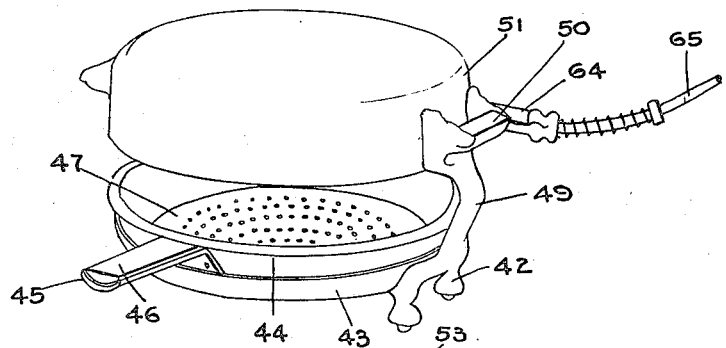
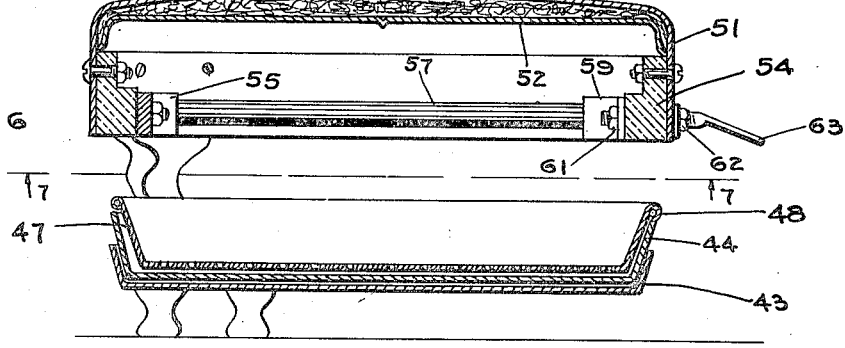
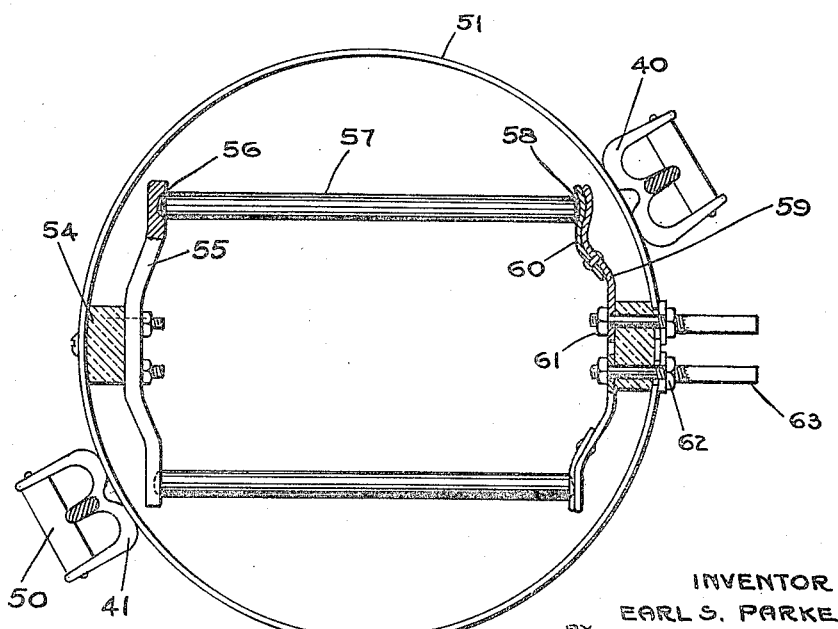
INVENTOR
EARL S. PARKER
BY Hazard and Miller
ATTORNEYS Patented Jan. 28, 1930

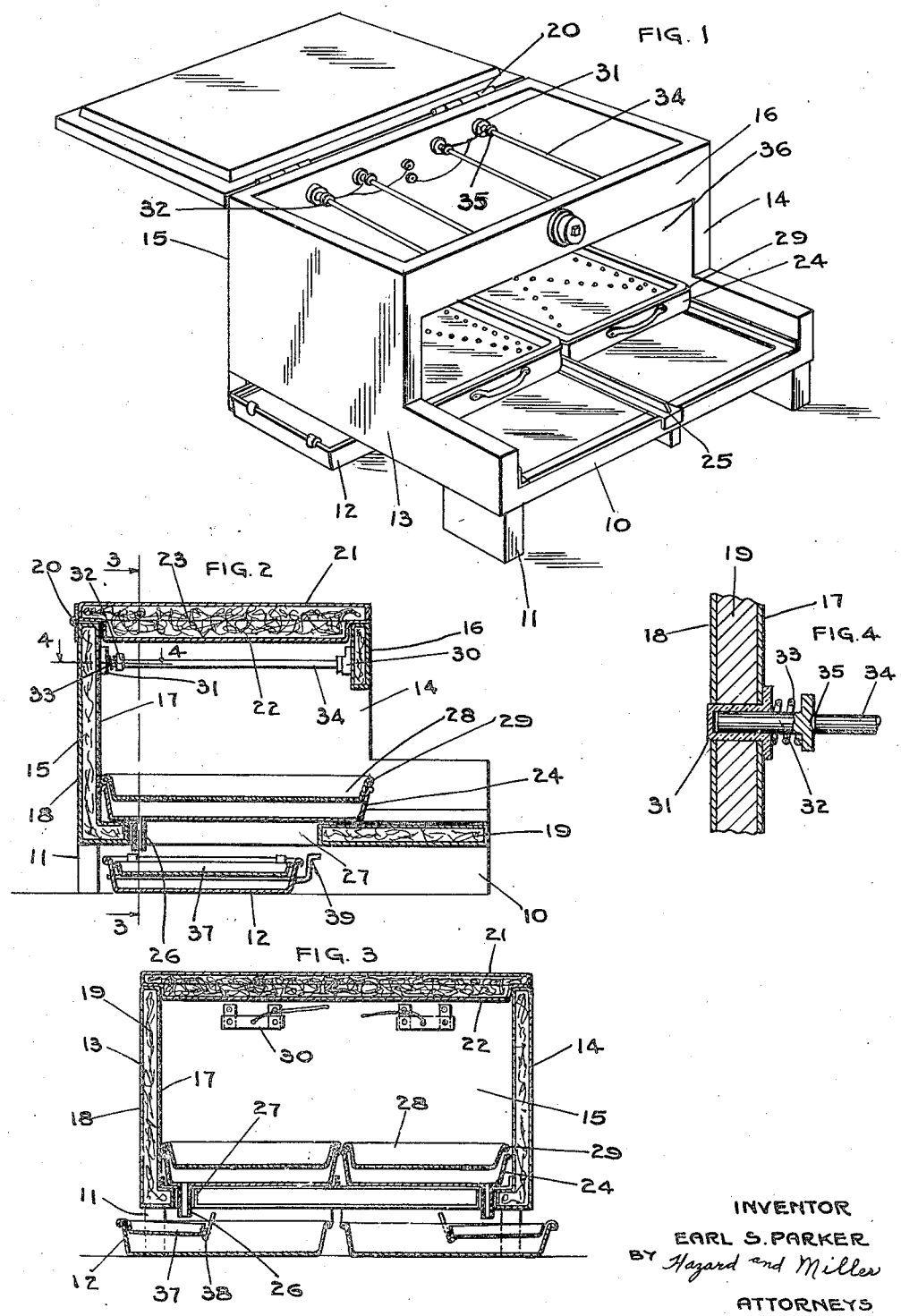

1,745,340

UNITED STATES PATENT OFFICE

EARL S. PARKER, OF LOS ANGELES, CALIFORNIA

BROILER AND TOASTER     REISSUED

Application filed September 17, 1927. Serial No. 220,269.

This invention relates to improvements in broilers and toasters, and may be considered as an improvement over the device disclosed in my co-pending application, Serial No. 135,056 filed Sept. 13, 1926 and patented June 4, 1929 No. 1,715,617.

An object of the invention is to provide an improved broiler and toaster wherein there is a receptacle above which is supported a perforated tray, which tray is adapted to support edibles or articles of food to be cooked or heated. The heating element is located above the tray and the heat is directed from it downwardly upon the article or articles of food on the tray. By reason of the fact that the tray is perforated, the fats, greases and juices may readily drain through it and fall onto the receptacle below it, and by reason of the fact that the tray is disposed between the receptacle and the heating element, the receptacle receiving the fats and greases will remain comparatively cool so that the fats and greases may cool and do not give off any odor or become burned or spatter around the vicinity.

Another object of the invention is to provide an improved broiler and toaster which is provided with an electric heating element adapted to utilize current from any suitable source of electric energy, such for example, being house current. The electric heating element being located above the edible which is to be cooked, is advantageous in several aspects. The heating element is adapted to become incandescent, giving off heat and also light which heat and light are reflected downwardly against the edible to cook it and also to illuminate it so that the condition of the edible as it is being cooked can be easily ascertained. An electric heating element is advantageous over a gas heater, in that the most efficient flame when gas is employed is a blue flame which does not give off sufficient light for this purpose. Also, no products of combustion are present and no soot can collect on the device which might fall on to the article being cooked.

A further object of the invention is to provide a broiler and toaster which is neat and attractive in appearance, and which may be placed upon a dining table and used thereon without danger of soiling the tablecloth.

From the foregoing and other objects in view which will be made manifest in the following detailed description and specifically pointed out in the appended claims, reference is had to the accompanying drawings for an illustrative embodiment of the invention, wherein:

Figure 1 is a perspective view of one form of broiler and toaster embodying the invention, this form being designed for use in restaurants and the like.

Fig. 2 is a vertical section through the broiler and toaster shown in Figure 1.

Fig. 3 is a vertical section taken upon the line 3—3 upon Figure 2.

Fig. 4 is a horizontal section taken upon the line 4—4 upon Figure 2, illustrating a detail of construction.

Fig. 5 is a perspective view of another form of the invention which has been designed for use upon a dining table.

Fig. 6 is a vertical section taken through the form of the invention shown in Figure 5.

Fig. 7 is a horizontal section taken upon the line 7—7 upon Figure 6 in the direction indicated.

Referring to the accompanying drawings wherein similar reference characters designate similar parts throughout, and referring particularly to Figures 1 to 4 inclusive, the improved broiler and toaster consists of a supporting table 10 supported by means of legs 11 a short distance above the table on which the device may be placed. The supporting table 10 is so elevated by the legs 11 that pans 12 may be positioned thereunder. Side walls 13 and 14 and a back wall 15 extend upwardly from the table, and a front wall 16 extends upwardly from the side walls intermediate the front and back edges of the supporting table 10. These walls, together with the supporting table, are preferably formed of spaced sheet metal walls, the inner sheet metal walls being indicated at 17 and the outer sheet metal walls being indicated at 18. Asbestos or other insulating material 19 occupies the space between the sheet metal walls, causing each wall to be heat insulated. A cover is provided which is hinged at 20 to the back wall 15 at its upper edge and may assume a closed position as shown in Figure 2 with its forward edge resting on the front wall 16. The cover is also preferably formed of two spaced sheet metal walls 21 and 22 between which there is insulating material 23. Receptacles 24 are slidable on the supporting table 10, and suitable guides or rails indicated at 25 are preferably provided on this table to facilitate their sliding. Each of the receptacles is preferably provided with a depending spout 26 adjacent one of its rear corners which extends through a slot 27 formed in the supporting table 10. Perforated trays 28 are provided for each of the receptacles 24, and these trays have a perforated bottom and side walls somewhat shorter than the side walls of the receptacles 24. Each tray has a bead 29 adapted to engage and rest upon the top edge of its respective receptacle 24 so that the perforated bottom of the tray will be supported or suspended above the bottom of the receptacle 24. The heating element for the broiler and toaster is electrically operated and consists of stationary sockets or brackets 30 secured upon the interior surface of the front wall 16. Sockets 31 are fastened to the rear wall 15 in alignment with the brackets or sockets 30. These sockets receive flanged plungers 32, and coil springs 33 are arranged about the plungers between the flange thereon and the socket. These springs serve to urge the plungers forwardly and to keep them in engagement with the electric heating elements 34. These heating elements may be of any preferred construction but are illustrated as being rods formed of an electrically resistant composition. The spring actuated plungers 32 permit expansion and contraction of the heating elements during the heating and cooling, and at all times keep them tight. Recesses 35 are preferably formed in the heads of the plungers to receive the ends of the heating elements, and in a similar manner the other ends of the heating elements extend into recesses in the brackets or sockets 30. The inside wall of the cover indicated at 21 is preferably highly polished, constituting a reflector and co-operating with the insulating material 23 to reflect the heat downwardly from the heating elements on to the edible which is placed on the perforated tray 28. Being highly polished, it will also reflect light from the glowing heating elements downwardly on the edible so that it may be inspected easily through the opening 36 in the front wall 16. The pans 12 are provided with auxiliary pans 37 extending across one side and which are pivoted as indicated at 38. These auxiliary pans may be tilted from their normal position by means of a crank 39 formed on the pintle 38 on which the auxiliary pan pivots. When in the normal position, a steak or chop placed on the perforated tray 28 will have fats, greases and juices drained from it while it is being cooked, and drop into the receptacle 24. From this receptacle, the fats, greases and juices flow through the spout 26 and are collected in the auxiliary pans 37. When the steak or chop has been completely cooked, the receptacle 24 on which it is positioned, is caused to slide forwardly on the table 10. The steak can then be transferred to a serving plate and the juices collected in the auxiliary pan 37 can be poured over the steak or chop with a spoon or ladle. In this way, the steak or chop is cooked in a relatively dry manner with the fats, greases and juices immediately passing off of the steak and falling onto the relatively cool receptacle 24, then flowing to the auxiliary pans 37. Each edible thus provides its own sauce or gravy. Excessive amounts of fats, greases and juices which are collected in the pans 37 and which are not used to pour over the steak or chop, can be dumped therefrom by the crank 39 into its respective pan 12. In this manner, each steak or chop will provide its own gravy which is instantly accessible for use, making the device highly desirable for use in restaurants.

The form of the invention shown in Figures 5, 6 and 7 is designed for family use, and may be placed upon a dining table. It consists of two side members 40 and 41, each of which forms two legs indicated at 42. The side members are connected to each other at their lower ends by a supporting tray 43 adapted to receive a receptacle 44 having a handle 45. The handle 45 preferably presents an upward concave surface to receive the downward convex surface on the handle 46 which is provided on the perforated supporting tray 47. This tray has a perforated bottom and has its side walls somewhat shorter than the side walls of the receptacle 44, and has a bead 48 adapted to engage and rest upon the top edge of the receptacle 44 so as to support the perforated bottom of the supporting tray above the bottom of the receptacle. The two side members 40 and 41 have upstanding portions 49 which are formed to provide handles 50 by which the device can be carried from place to place. These upstanding portions 49 are secured to and serve to support the outer wall 51 of the cover. An inner wall 52 is secured to the outer wall 51 and is spaced therefrom, and the space between the inner and outer walls is packed with asbestos or equivalent heat insulating material indicated at 53. On the interior of the wall 51 below the inner wall 52, two blocks of insulating material 54 are secured, and these blocks are arranged at diametrically opposite sides of the cover. Against the inner surface of one of the blocks 54 there is secured a relatively heavy arm or bracket 55 having recesses 56 in its ends which receive the ends of the electric heating elements 57 which are similar in construction to the heating elements 34. The opposite ends of the heating elements extend into recesses 58 formed in the ends of springs 59 which are fastened against the inner surface of the other insulating block 54. The outer ends of these leaf springs may be formed of a plurality of pieces as indicated at 60, so as to strengthen the springs under the heat developed by the heating elements. The leaf springs are held in place by nuts 61 which are tightened on bolts 62 formed on the ends of contacts 63 which are receivable in an electric socket 64 attached to a light cord 65 which may be plugged into any suitable socket conveying house current. In this modification, the edible is placed on the perforated tray 47, and the perforated tray is then placed on the receptacle 44 with the handles 45 and 46 in vertical alignment. The receptacle 44 with the tray thereon, can then be slipped between the upright portions 49 on the side members 40 and 41. The heat developed by the electric heating elements 57 will be reflected downward by the insulating material 53 and the polished surface which is provided on the under side of the inner wall 52 on the cover. Fats, greases and juices will immediately drain therefrom through the perforated bottom and fall into the receptacle 44 which is relatively cool. When the edible has been cooked, these fats, greases and juices can be poured over the edible if desired, or otherwise used or disposed of. This form of the invention is designed for use upon a dining table and the polished surface on the under side of the inner wall acts as a reflector reflecting the light from the glowing heating element 57 downward onto the tray 47 to illuminate the edible thereon. In practice, it will be found that this device is so constructed that there is no danger of grease spattering over the surrounding tablecloth.

From the above described construction it will be appreciated that an improved broiler and toaster is provided consisting of a receptacle over which is positioned a perforated supporting tray upon which the edible may be placed, and that an electric heating element is arranged above the supporting tray and adapted to have the heat thrown downwardly therefrom against the top of the edible from which fats, greases and juices may drain into a relatively cool receptacle. Furthermore, by reason of the fact that the heating element is located above the supporting tray, the use of an electric heating element is highly advantageous over other forms of heating elements, which advantages would not be present if the heating element were not located over the supporting tray.

It will be understood that various changes in the details of construction may be made without departing from the spirit or scope of the invention as defined by the appended claims.

I claim:

1. A broiler or toaster comprising a receptacle, means providing a perforated support above the receptacle, dimensions of the perforations being smaller than the distances between adjacent perforations and being relatively small so as to effectively prevent any substantial amount of heat from passing directly therethrough, and a heating element above the perforated support whereby an edible which is to be cooked or heated may be placed upon the perforated support and heated by the heating element, and fats, greases and juices may drain from the edible through the perforations into the relatively cool receptacle.

2. A broiler or toaster comprising a receptacle, means providing a perforated tray above the receptacle, dimensions of the perforations being smaller than the distances between adjacent perforations and being relatively small so as to effectively prevent any substantial amount of heat from passing directly therethrough, and an electric heating element above the perforated tray whereby an edible which is to be cooked or heated may be placed upon said perforated tray and heated by the electric heating element, and fats, greases and juices may drain through the perforations in the tray into the receptacle.

3. A broiler or toaster comprising a receptacle, a perforated tray disposed above the receptacle, dimensions of the perforations being smaller than the distances between adjacent perforations and being relatively small so as to effectively prevent any substantial amount of heat from passing directly therethrough, an electric heating element disposed above the tray, and a cover disposed above the heating element.

4. A broiler or toaster comprising a receptacle, a perforated tray disposed above the receptacle, dimensions of the perforations being smaller than the distances between adjacent perforations and being relatively small so as to effectively prevent any substantial amount of heat from passing directly therethrough, an electric heating element disposed above the tray, a cover disposed above the heating element, and means providing a heat insulator upon the cover which reflects the heat from the heating element downwardly against the perforated tray.

5. A broiler or toaster comprising a receptacle, means providing a perforated tray above the receptacle, dimensions of the perforations being smaller than the distances between adjacent perforations and being relatively small so as to effectively prevent any substantial amount of heat from passing directly therethrough, a cover disposed over the tray, and electrical heating elements mounted beneath the cover.

6. A broiler or toaster comprising a receptacle, means providing a perforated tray above the receptacle, dimensions of the perforations being smaller than the distances between adjacent perforations and being relatively small so as to effectively prevent any substantial amount of heat from passing directly therethrough, a cover disposed over the tray, and electrical heating elements mounted beneath the cover, said cover being double walled and having an insulating material disposed between its walls.

7. A broiler or toaster comprising a legged support, a receptacle on the support, a perforated tray for edibles disposed above the receptacle, dimensions of the perforations being smaller than the distances between adjacent perforations and being relatively small so as to effectively prevent any substantial amount of heat from passing directly therethrough, means extending upwardly from the legs, and heating elements and a cover supported by said means over the perforated tray.

8. A broiler or toaster comprising a receptacle, means providing a perforated tray in the receptacle above the bottom of the receptacle and below the top edges of the wall of the receptacle, the perforations having dimensions smaller than the distances between adjacent perforations and being relatively small so as to effectively prevent any substantial amount of heat from passing directly therethrough, and electric heating elements disposed over said tray.

9. A broiler or toaster comprising a receptacle, means providing a perforated tray in the receptacle having side walls adapted to fit within and to suspend the tray from the tops of the side walls of the receptacle above the bottom of the receptacle, the perforations having dimensions smaller than the distances between adjacent perforations and being relatively small so as to effectively prevent any substantial amount of heat from passing directly therethrough, and electric heating elements mounted above said perforated tray.

In testimony whereof I have signed my name to this specification.

EARL S. PARKER.